April 30, 1929.   A. WUNDERLICH   1,711,193
DEVICE FOR TRANSFERRING LUBRICANTS AND THE LIKE
Filed Aug. 20, 1927

INVENTOR.
Adolph Wunderlich
BY
Fay Oberlin & Fay
ATTORNEYS

Patented Apr. 30, 1929.

1,711,193

UNITED STATES PATENT OFFICE.

ADOLPH WUNDERLICH, OF CLEVELAND HEIGHTS, OHIO, ASSIGNOR TO THE WARREN REFINING AND CHEMICAL COMPANY, OF CLEVELAND, OHIO, A CORPORATION OF OHIO.

DEVICE FOR TRANSFERRING LUBRICANTS AND THE LIKE.

Application filed August 20, 1927. Serial No. 214,248.

This invention, as indicated, relates to devices for transferring lubricant and the like, and resides specifically in the provision of a motor driven tool for removing heavy grease or similar materials from more or less inaccessible locations.

Many machines require lubrication consisting of heavy grease which is usually packed into a casing having a relatively small filling opening and no other opening, and it is desirable that this grease should be periodically removed in order that the casing may be filled with new, clean grease. In the transmission and differential casings for automobiles, for instance, a heavy grease is used, and it is almost impossible through the use of such tools as were known before the present invention to remove the grease from these casings. The object of the present invention then is to provide a device through the use of which grease or similar material may be removed from such casings. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
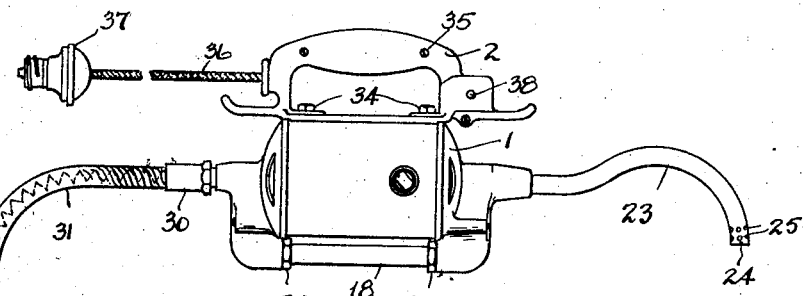
Figure 2:
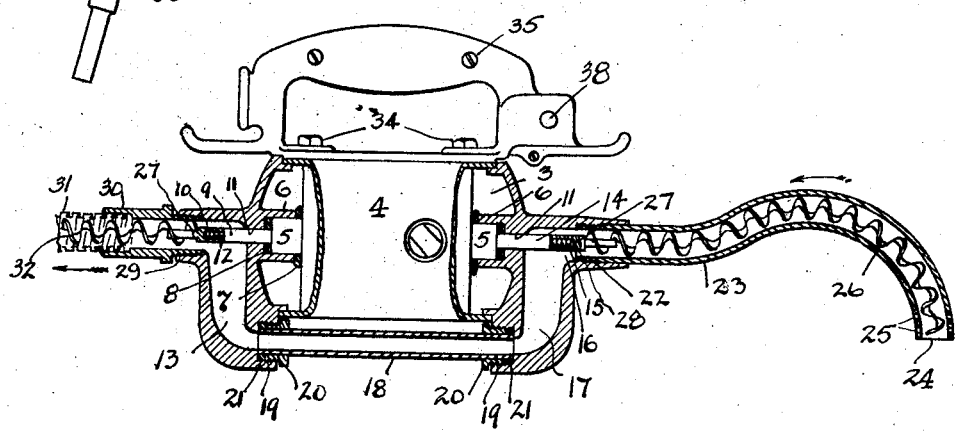

In said annexed drawing:

Fig. 1 is a side elevation of my device; and Fig. 2 is an elevation, partly in section, clearly showing the conveyor means whereby grease may be drawn from a casing in which it has been packed.

My tool consists essentially of a casing 1 and a handle 2, the casing providing a motor receiving recess 3 in which a motor 4 is mounted, the hubs 5 of the motor being received in aligned journals 6 provided interiorly of such recess. Packing 7 and 8 is provided to prevent the grease from being forced into the motor receiving recess 3.

The hub 5 of the motor is provided with a spindle 9 having a reduced screw-threaded end 10 and which extends through an aperture 11 in the wall of the recess 3 and into the opening 12 of the passage 13. The hub 5 is provided with a similar spindle 14 having a reduced screw-threaded end 15 and projecting through a similar aperture 11 into opening 16 of the passage 17. The passages 13 and 17 are connected through a tube 18 which is held in position in the adjacent ends of said passages 13 and 17 by means of sleeve couplings 20 threadedly engaged with said ends as at 19, packing 21 being provided to prevent the extrusion of grease around such couplings.

Screw-threadedly engaged in the opening 16, as at 22, is a rigid curved intake tube 23, having a closed end 24 and being provided adjacent its closed end with peripherally spaced apertures 25. The tube 23 encloses the flexible worm conveyor 26 which carries at its inner end a member 27 provided with a screw-threaded socket 28 in which the reduced screw-threaded end 15 of the spindle 14 is engaged.

Threaded into the opening 12 of the passage 13, as at 29, is a coupling member 30, to the free end of which is attached in a well known manner, one end of a flexible tube 31 enclosing a worm conveyor 32 which carries at its inner end a member 27 similar to that carried by the conveyor 26, and having a similar socket 28 in which is engaged the reduced end 10 of the spindle 9. The tube 31 carries at its free end a discharge nozzle 33.

The handle 2 is rigidly connected to the casing 1 by means of machine screws 34. This handle is made up of two sections secured together by means of screws or similar fastenings 35, and interiorly of the handle there are provided terminals to which the ends of the conductor 36 carrying the usual screw socket plug 37 may be attached. Terminals are also supplied on the motor, and connection between the handle terminals and the motor terminals is effected through a switch in the handle which includes a projecting operating button 38. This button is conveniently located on the handle in such a position that it may be operated by one finger of the hand in wlcih the operator carries the handle of the lubricant transferring device.

In operation, the device is gripped by the handle 2 and the tube 23 is inserted through the filling opening of a grease-containing casing (not shown), and thereafter the button 38 is pressed by the operator to cause the motor 4 to rotate. Through the connection of the spindle 14 with the member 27, the conveyor 26 is correspondingly rotated, and grease is drawn in through the apertures 25 and carried by the conveyor into the opening 16 of the passage 17. As more grease is carried along the tube 23, the grease in the passage 17 is gradually forced through the tube 18 and into the opening 12 of the passage 13, where the conveyor 32, which is being rotated through the connection of the spindle 9 with its member 27, picks up the grease and forces it on through the flexible tube 31 and finally out of the nozzle 33 and into a container provided for the reception of the waste grease.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A device of the class described, comprising a casing providing an intake and an outlet, a worm conveyor in said intake, and a motor in said casing connected to said worm and adapted to rotate the same.

2. A device of the class described, comprising a casing providing an intake and an outlet, a worm conveyor in said intake, a worm conveyor in said outlet, and a motor in said casing and connected intermediate said worms to drive the same.

3. A device of the class described comprising in combination, a casing having therein a motor receiving recess and a passage around said recess terminating at the respective ends of said casing in aligned openings, a rigid curved tube leading from one of said openings, a flexible tube leading from the other of said openings, a worm conveyor in said rigid tube, a motor in said motor receiving recess, and driving connections between said motor and said worm.

4. A device of the class described comprising in combination, a casing having therein a motor receiving recess and a passage around said recess terminating at the respective ends of said casing in aligned openings, a rigid curved tube leading from one of said openings, a flexible tube leading from the other of said openings, a worm conveyor in said rigid tube, a motor in said motor receiving recess, contact terminals on said motor, driving connections between said motor and said worm, and a handle member attached to said casing, an electrical conductor leading from contact terminals in said handle and adapted to be connected to a source of electrical supply, and electrical connections between said handle terminals and said motor terminals and extending through a switch mounted in said handle for operation by the hand in which the operator holds the handle.

5. A device of the class described comprising in combination a casing having a motor receiving recess, a motor in said recess, a handle attached to said casing and carrying a switch for controlling said motor, journals in opposite ends of said motor receiving recess, hubs extending from opposite ends of said motor and mounted in said journals respectively, a passage in said casing, terminating in openings at opposite ends of said casing, said openings being aligned with each other and with said journals, a rigid, curved tube mounted in and extending from one of said openings, a worm conveyor in said tube, a flexible tube mounted in and extending from the other of said openings, a worm conveyor in said tube, a screw-threaded spindle extending from each of said motor hubs and into said respective openings, and a screw-threaded socket on the inner end of each of said worms and threadedly engaged with one of said spindles.

Signed by me this 16th day of August, 1927.

ADOLPH WUNDERLICH.